No. 612,499. Patented Oct. 18, 1898.
P. L. HUSSEY.
COMBINATION CRANK AND SHAFT.
(Application filed Dec. 29, 1897.)
(No Model.)

WITNESSES
INVENTOR

UNITED STATES PATENT OFFICE.

PATRICK L. HUSSEY, OF DAYTON, OHIO, ASSIGNOR TO THE DAVIS SEWING MACHINE COMPANY, OF SAME PLACE.

COMBINATION CRANK AND SHAFT.

SPECIFICATION forming part of Letters Patent No. 612,499, dated October 18, 1898.

Application filed December 29, 1897. Serial No. 664,190. (No model.)

*To all whom it may concern:*

Be it known that I, PATRICK L. HUSSEY, a citizen of the United States, residing at Dayton, in the county of Montgomery and State of Ohio, have invented certain new and useful Improvements in a Combination Crank and Shaft, of which the following is a full, clear, and exact description, reference being had to the accompanying drawings, forming part of this specification.

My invention relates to an improvement in a combination crank and shaft or axle for bicycles and the like and has to do with the manner and form in which it is constructed.

In the use of cranks for bicycles it has heretofore been customary to make the crank with radially-extending arms, to which the sprocket-wheel was attached by means of screws or bolts, which have a tendency to work or become loose, and thus having loose and unsatisfactory joints or connections. It is to overcome and obviate this difficulty that I have designed my improvement, which consists in forging the crank with radially-extending arms having integrally-formed studs and is especially adapted for use on tandem-wheels or the like, where a multiple of sprockets are used, these sprockets fastened to one and the same crank or axle, in which case, of course, means must be provided for the proper separation of the sprockets, whereby they are firmly held in place against any lateral motion and so mounted as to at all times be firm and secure in their relation to the shaft or crank, as will be more fully hereinafter described.

Figure 1:
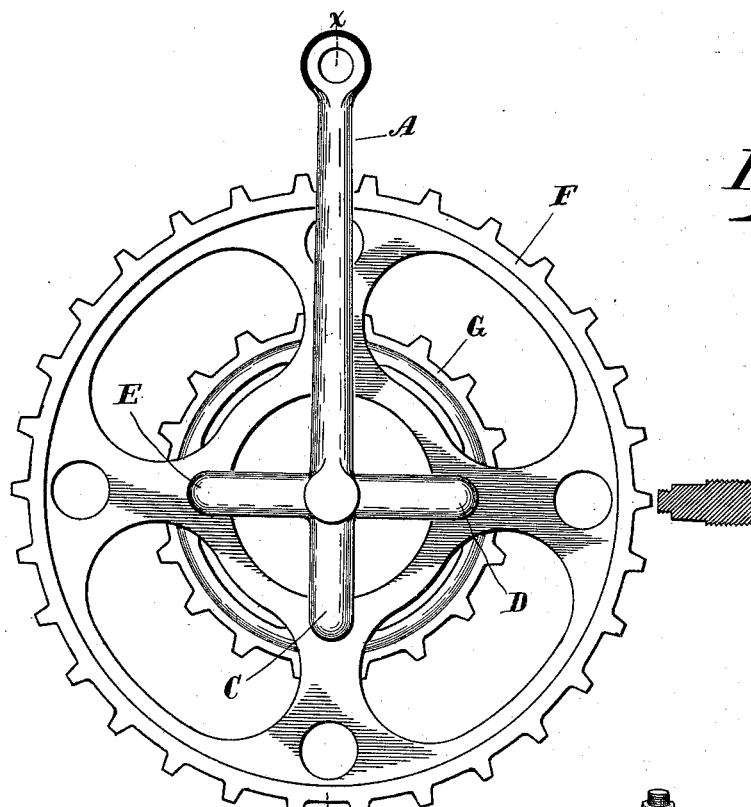
Figure 2:
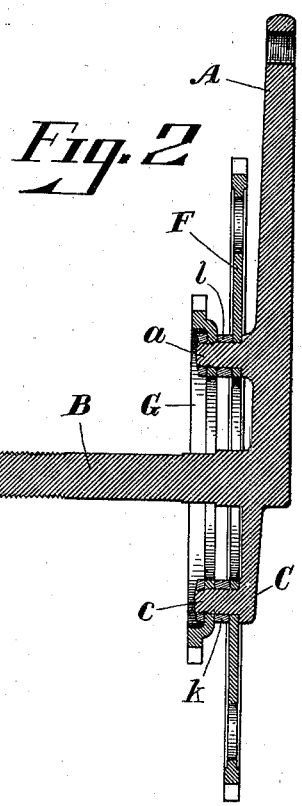
Figure 3:
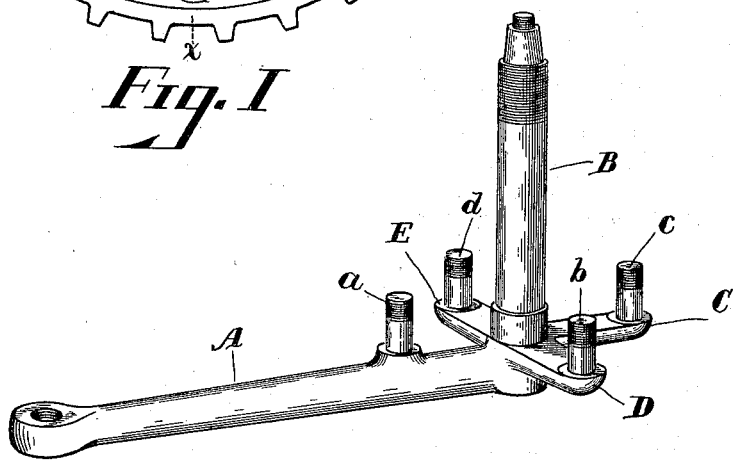

In the drawings, Figure 1 is a side elevation of my improved crank and shaft with two sprocket-wheels attached. Fig. 2 is a vertical cross-section taken through line X X of Fig. 1. Fig. 3 is a perspective view of my improved crank and shaft.

Like letters of reference indicate identical parts in all the figures.

A is the crank, of any desired length or shape.

B is the crank-axle, forged integrally with the crank A.

Forged integrally with the crank A are radially-extending driving-arms C, D, and E, to which arms the sprocket-wheel is attached. On these driving-arms and the crank A, I have formed or forged studs *a*, *b*, *c*, and *d*, which studs are integral with said arms and crank.

The sprocket-wheel to be attached is provided with openings or holes to correspond with and fit the studs, the sprocket-wheel being held in place by nuts fitting the studs, which of course are screw-threaded.

Heretofore when radially-extending arms were used the sprocket-wheel was attached by means of screws or bolts passing through holes bored in the arms, the bolts or screws held in place by nuts. The strain and driving force with this construction centers on the screws, which have a tendency after some usage to wear and become loose, thus permitting the sprocket-wheel to vibrate or slightly wabble, producing undesirable results, for if the sprocket-wheel is thus permitted to become loose and vibrate it necessarily moves the driving-chain with it, pulling it slightly to one side and out of line with the rear sprocket or gear wheel and making it impossible for the chain to register with the sprockets on the rear gear or sprocket wheel, thus producing friction and an undesirable strain, making it more difficult to propel the wheel. With my improved construction this difficulty is obviated and done away with. The studs *a*, *b*, *c*, and *d* are integral with the arms and crank, the crank, arms, and studs all being forged from one piece, thus producing firm and rigid attaching and bearing points for the sprocket-wheel and making it impossible to work or become loose. These studs may of course be made of any suitable length, should it be desired to apply a multiple of sprockets adjacently, two being shown in Figs. 1 and 2. In this case the studs are made of sufficient length to permit the application or adjustment of the desired number of sprocket-wheels. In the illustration two are shown, F and G. Means must of course be provided for properly holding the adjacently-mounted sprocket-wheels apart and in their proper positions, which I do by the use of collars or separators *k* and *l*, which must be of a sufficient width and thickness to hold the sprockets the proper distance apart and at the same time hold them firmly and rigidly against any lateral movement, which of course would be objectionable when propelling the machine, as any lateral motion would prevent proper registering of the sprocket drive-chain with the sprockets it encircles.

By the use of separators any number of sprockets can be attached, according to the length of the studs.

In the drawings I have shown but three radially-extending arms, though of course it will be readily understood that there may be any number with their corresponding studs, and I do not limit myself to the form shown in the drawings.

What I claim, and desire to secure by Letters Patent, is—

A driving-crank and shaft with radially-extending arms, said arms and crank provided with studs, all of said parts forged from and in one piece, said studs of suitable length to permit the attachment of a multiple of sprockets, in combination with separators or collars to separate the sprockets, substantially as and for the purpose described.

PATRICK L. HUSSEY.

Witnesses:
F. T. HUFFMAN,
D. E. WELLS.